United States Patent
Fjallstrom

[11] Patent Number: 5,814,187
[45] Date of Patent: Sep. 29, 1998

[54] APPARATUS AND METHOD FOR TREATING A PULP SLURRY OF WASTE PAPER

[75] Inventor: Roland Fjallstrom, Lawrenceville, Ga.

[73] Assignee: Alfa Laval Celleco AB, Tumba, Sweden

[21] Appl. No.: 45,684

[22] Filed: Apr. 14, 1993

[51] Int. Cl.[6] .................................................. D21C 5/02
[52] U.S. Cl. ................................ 162/4; 162/55; 209/273
[58] Field of Search ...................... 162/4, 5, 55; 209/250, 209/273

[56] References Cited

U.S. PATENT DOCUMENTS

| 3,827,567 | 8/1974 | Rundquist | 209/250 |
|---|---|---|---|
| 4,167,438 | 9/1979 | Holz | 162/55 |
| 4,332,638 | 6/1982 | Mauer et al. | 162/5 |
| 4,334,984 | 6/1982 | Vagac et al. | 162/4 |
| 4,360,402 | 11/1982 | Ortner et al. | 162/5 |
| 4,865,690 | 9/1989 | Bernard et al. | 162/5 |
| 4,915,821 | 4/1990 | Lamort | 162/4 |
| 5,124,029 | 6/1992 | Fjallstrom et al. | 209/250 |

Primary Examiner—Karen M. Hastings
Attorney, Agent, or Firm—Fish & Richardson P.C.

[57] ABSTRACT

An apparatus for treating a pulp slurry of waste paper including long fibers, short fibers and large and fine impurities includes the step of spraying the slurry through a gaseous medium upon a screen to separate long fibers and large impurities from small fibers and fine impurities.

8 Claims, 1 Drawing Sheet

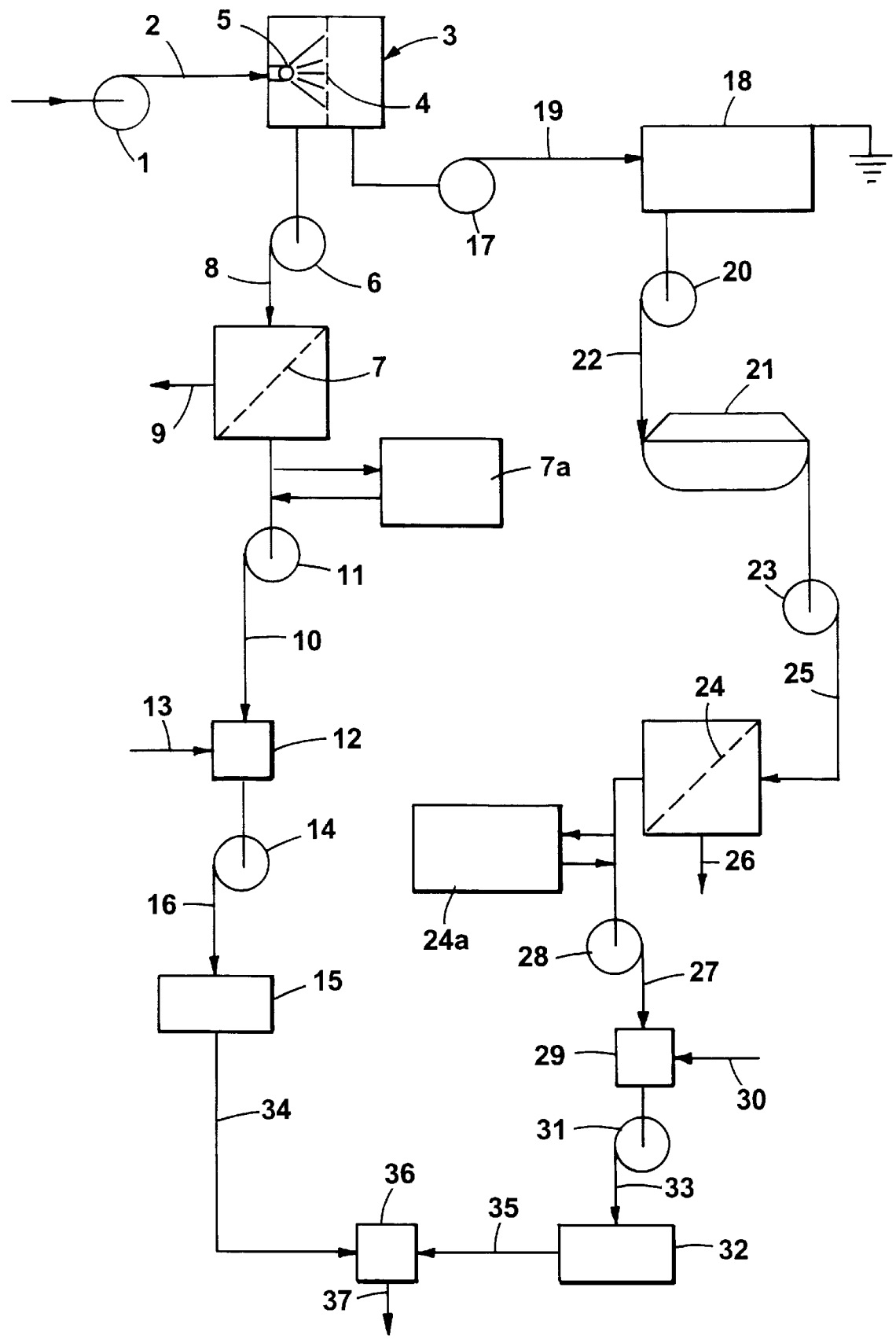

APPARATUS AND METHOD FOR TREATING A PULP SLURRY OF WASTE PAPER

FIELD OF THE INVENTION

The present invention relates to an apparatus and a method for treating a pulp slurry of waste paper containing relatively large deformable impurities of strings, foils, and clumps of glue, and relatively fine impurities of small particles, printing ink and filler material such as ashes and clay.

BACKGROUND OF THE INVENTION

In the conventional process of creating a fibre pulp from waste paper, initially the waste paper is repulped to form a pulp slurry of waste paper, and then the pulp slurry is treated in a number of consecutive stages to separate various undesirable impurities. Typically, said consecutive stages include:

(a) centrifugal separation of the pulp slurry to remove relatively large and dense impurities, such as staples and other metallic particles;

(b) coarse pressure screening of the pulp slurry to remove the relatively large impurities which have not been removed by said centrifugal separation;

(c) flotation separation of the pulp slurry to remove printing ink;

(d) washing of the pulp slurry to remove filler material, such as ashes and clay, and residual printing ink;

(e) fine pressure screening of the pulp slurry to remove fine impurities in the form of small particles; and (f) centrifugal separation of the pulp slurry to remove residual fine materials such as ink, dirt specks and other fine impurities.

The pulp slurry substantially freed from impurities includes a variety of fibres from a variety of paper grades. Depending on the final requirement of the pulp, the pulp slurry may require an increase in brightness obtained by mixing a bleaching chemical with the fibres.

A primary deficiency with the conventional process is the lack of an efficient selective separation of undesirable, relatively large and relatively small impurities, such as plastic foils, fragments of other plastic particles, and so-called "stickies", formed from glue and other adhesives. Thus, the above-noted stage (b) of the conventional process—coarse pressure screening—has a poor efficiency with regard to rejecting undesirable relatively large impurities in the form of flexible plastic foils and fragments of other flexible plastic particles. Such large flexible particles often occur in low-selective waste paper. Said poor efficiency is due to the fact that the coarse screening has to be operated under high pressure, in order to ensure passage of long fibres and limit the liquid content of the rejected coarse fraction, so that the amount of polluting printing ink in the coarse fraction is reduced. In consequence of said high pressure some undesirable large flexible particles are pushed, with deformation, through the screen openings. Furthermore, some large impurities in the form of deformable clumps of glue occurring in the slurry of waste paper may escape through the screen by extrusion of said clumps through the screen openings, as the clumps are subjected to said high pressure. The term "glue" is used to mean any glue-like substance, such as adhesives, hot-melts, waxes, so-called "stickies" etc.

In the above-noted stage (e) of the Conventional process—fine pressure screening—the screen openings of the screen have to be large enough to allow bulkier long fibres to pass as accept. In consequence, small deformable impurities, such as glue, may also pass through the screen by extrusion through the screen openings.

Another deficiency of the conventional process is that a considerable amount of good fibres, particularly long fibres, are lost with the impurities rejected. In the above-noted stage (c)—flotation separation—some long fibres tend to float and be rejected with printing ink. In stage (e)—fine pressure screening—some long fibres or flocks of fibres may be blocked by the fine screen used and rejected with the undesired small particles.

SUMMARY OF THE INVENTION

The above-mentioned deficiencies of the conventional process of creating a fibre pulp from waste paper are eliminated by the apparatus in accordance with the present invention. Thus, the apparatus of the invention reduces loss of good fibres, in particular long fibres, and provides a more efficient separation of impurities from the waste paper pulp slurry.

In a principal aspect, the invention includes an apparatus for treating a pulp slurry of waste paper, comprising:

means for spraying jets of the pulp slurry through a gaseous medium;

a first screen positioned in said gaseous medium, so as to be hit by said jets of pulp slurry, said first screen having screen openings sized such that the pulp slurry hitting said first screen is fractionated into a rejected first aqueous fraction containing relatively long fibres and the large impurities, and an accepted second aqueous fraction containing relatively short fibres and substantially all of the fine impurities;

a second screen having screen openings sized to allow passage of the long fibres and to block the large impurities, provided that the large impurities are not deformed;

means for conducting said first aqueous fraction from said first screen to said second screen, and means arranged to press said first aqueous fraction gently through said second screen, such that the large deformable impurities are not deformed as they are pushed against the screen openings of said second screen, for separating said first aqueous fraction into a rejected third aqueous fraction containing the large impurities, and an accepted fourth aqueous fraction containing the long fibres.

By spraying the pulp slurry through a gaseous medium, preferably air, the sprayed long fibres and large impurities, which have relatively large specific surfaces, are retarded by the frictional drag of the surrounding gas medium and thereby are easily blocked by said first screen, whereas short fibres and small impurities, which have a relatively small specific surface, substantially keep their velocity and thereby penetrate said first screen. As a result, substantially all of the printing ink in the slurry penetrates said first screen, except for an insignificant amount adhering to the long fibres, so that said first aqueous fraction containing long fibres is substantially freed from loose particles of printing ink. This permits said first aqueous fraction to be gently pressed through said second screen in spite of the consequence that a significant amount of liquid will be rejected, because the rejected liquid will be free from polluting printing ink. In addition, the screen openings of said second screen can be larger than conventional, without risking deformable impurities to penetrate said second screen, whereby the rejection of good long fibres is reduced.

While the definition of "long fibers" is somewhat variable, in general, we refer to relatively long fibers as those having a length equal to or greater than 1.5 mm, usually in the range $\geq$1.5–2.0 mm. Relatively short fibers are in general those having a length of less than 1.5 mm, typically 1.0 to 1.5 mm.

Advantageously, the apparatus further comprises a flotation device, in which the printing ink is floated off from said second aqueous fraction containing short fibres, whereby no desirable long fibres are lost by flotation. Since said second aqueous fraction is richer in printing ink, compared to the unfractionated slurry, the flotation operation can be carried out more efficiently.

The apparatus may further comprise means for separately mixing chemicals with the long fibres obtained through said second screen and with the short fibres obtained through said third screen, for bleaching the fibres, and means for mixing bleached long fibres with bleached short fibres, for creating a final bright fibre pulp suited for making white paper. This is of advantage because the short fibres need to be bleached in a chemicals-containing solution which is up to five times stronger than that of the solution required for bleaching long fibres. Thus, the consumption of chemicals can be substantially reduced, as compared to bleaching a fibre pulp containing long fibres as well as short fibres, because in the latter case a larger volume of the stronger solution has to be employed.

In another aspect, the invention includes a method of treating the slurry of waste paper, comprising the steps of:

spraying the slurry in the form of jets through a gaseous medium;

screening said jets of slurry such that the slurry is fractionated into a rejected first aqueous fraction containing relatively long fibres and the large impurities, and an accepted second aqueous fraction containing relatively short fibres and substantially all of the fine impurities, and screening said aqueous first fraction of the slurry, without substantially deforming the large impurities therein, such that said first aqueous fraction is separated into a rejected third aqueous fraction containing the large impurities, and an accepted fourth aqueous fraction containing the long fibres.

BRIEF DESCRIPTION OF THE DRAWING

The FIGURE is a schematic flow chart of a preferred embodiment of the apparatus in accordance with the present invention.

DESCRIPTION OF THE PREFERRED EMBODIMENT

With reference to the drawings, a pulp slurry of waste paper to be treated, which has initially been cleaned from large and dense impurities, such as staples and other metallic particles, is pumped by a pump 1 via a conduit 2 to a spray filter 3 having a screen 4. The spray filter 3 comprises a vessel of any convenient dimensions having fixtures suitable for retaining the screen 4. The diameter of the screen openings of the screen 4 is chosen in the range of 500 to 1000 micron. The spray filter also comprises one or more spray nozzles 5 positioned to receive the slurry from conduit 2 and spray the slurry in the form of jets through air in the spray filter 3 against the screen 4, so that the pulp slurry is fractionated into a rejected first aqueous fraction containing relatively long fibres and relatively large deformable impurities of strings, foils and clumps of glue, and an accepted second aqueous fraction containing relatively short fibres and relatively fine impurities of small particles, printing ink and filler material, such as ashes and clay.

Although the filter 3 is shown as a flat screen, it may take the form of a rotating disc (or a plurality of rotating discs) or a drum.

The first aqueous fraction containing long fibres is pumped by a pump 6 from the spray filter 4 to a coarse screen 7 via a conduit 8. The diameter of the screen openings of the screen 7 is chosen in the range of 0.2 to 0.3 millimeters, preferably 0.2 millimeters. The pump 6 is adapted to press said first aqueous fraction gently through the screen 7, without substantially deforming large flexible impurities occurring in said first aqueous fraction, so that the latter is separated into a rejected third aqueous fraction containing the large flexible impurities, and an accepted fourth aqueous fraction containing the long fibres. Said rejected third aqueous fraction is discharged from the screen 7 through a conduit 9. Alternatively, the screen 7 may be replaced by a spray filter of a type similar to the spray filter 3.

As a further alternative, the screen 7 may be a rotary drum filter, i.e. a cylinder whose walls have holes or slots of the desired size. The pressure drop across the screen is such that the fibers are forced gently through the screen openings while the impurities are retained on the other side. This will normally require a feed pressure of, say, about 5 to about 20 psi.

The fourth aqueous fraction normally contains not more than 2–4% bone dry solids and is therefore dewatered, in a dewatering apparatus 7a, to a bone dry solids content of about 30%, in order to be suited for bleaching. The dewatering device may be any conventional equipment capable of filtering out liquid from the slurry. It can, for example, be a drum filter, a disc filter, a screw press or a belt press.

Through a conduit 10 said dewatered fourth aqueous fraction is pumped by a pump 11 from the screen 7 to a mixing device 12, in which the long fibres are mixed with conventional bleaching chemicals supplied to the mixing device 12 via a conduit 13. The mixture of chemicals and long fibres is pumped by a pump 14 from the mixing device 12 to a reaction vessel 15 where the bleaching is carried out, via a conduit 16.

This reaction vessel may be an agitated tank or chest, or a tower, in accordance with conventional practice.

The second aqueous fraction containing short fibres and fine impurities is pumped by a pump 17 from the spray filter 3 to a flotation device 18 via a conduit 19. The flotation device 18 may again be any of a variety of commercially available models, such as the Beloit "PDM-Cell" or the Black Clawson "BC-Flotator". In the flotation device 18 printing ink is floated off from the second aqueous fraction to produce a substantially de-inked aqueous fraction of short fibres, which is pumped by a pump 20 from the flotation device 18 to a washing device 21 via a conduit 22. The washing device may be any of a variety of conventional models such as the Celleco GDX, FDW or SD Filters or the Black Clawson DNT Filter. In the washing device 21, filler material, such as ashes and clay, and residual printing ink are washed from the de-inked aqueous fraction of short fibres.

The washed aqueous fraction of short fibres is pumped by a pump 23 from the washing device 21 to a fine screen 24 via a conduit 25. The diameter of the screen openings of the screen 24 are chosen in the range of 0.1 to 0.2 millimeters, preferably 0.15 millimeters. The screen 24, which may again be flat or rotary in construction, separates fine impurities in the form of small particles from said washed aqueous fraction of short fibres to produce an accepted clean aqueous fraction of short fibres. The separated fine impurities are discharged from the screen 24 through a conduit 26.

The clean aqueous fraction of short fibres having a bone dry solids content of not more than 5% by weight is dewatered to a bone dry solids content of about 30% by weight in an apparatus 24a. This device may be of the same general design as the device 7a.

Through a conduit 27 the dewatered aqueous fraction of short fibres is pumped by a pump 28 from the dewatering device 24a to a mixing device 29, in which the short fibres are mixed with bleaching chemicals supplied to the mixing device 29 via a conduit 30. The mixture of chemicals and short fibres is pumped by a pump 31 from the mixing device 29 to a reaction vessel 32, like the vessel 15 via a conduit 33.

Through conduits 34 and 35, bleached long and short fibres are transferred from the reaction vessels 15, 32 to a mixing device 36, in which the bleached long and short fibres are mixed to produce a final bright pulp suited for making white paper. The final bright pulp is drawn from the mixing device 36 via a conduit 37.

The above-described embodiment is particularly suited for treating a pulp slurry of low-selective waste paper, e.g. mixed office waste. However, it is possible to eliminate one or more of the treatment stages if the pulp slurry is obtained from a more selected waste paper and/or the quality of the final pulp is not crucial. For example, either the flotation device 18 or the washing device 21, or both devices, may be eliminated.

What is claimed is:

1. A method of treating a pulp slurry of waste paper containing relatively large deformable impurities of strings, foils and clumps of glue, and relatively fine impurities of small particles, printing ink and filler material, including ashes and clay, the method comprising the steps of:

spraying the pulp slurry in the form of jets through a gaseous medium, screening said jets of pulp slurry such that the pulp slurry is fractionated into a rejected first aqueous fraction containing relatively long fibres and the large impurities, and an accepted second aqueous fraction containing relatively short fibres and substantially all of the fine impurities, and screening said aqueous first fraction of the pulp slurry, without substantially deforming the large impurities therein, such that said first aqueous fraction is separated into a rejected third aqueous fraction containing the large impurities, and an accepted fourth aqueous fraction containing the long fibres.

2. The method of claim 1, wherein the long fibres contained in said fourth fraction are mixed with chemicals for bleaching the long fibres.

3. The method of claim 1, wherein the fine impurities of small particles are screened from said second aqueous fraction.

4. The method of claim 3, wherein the short fibres contained in said second aqueous fraction freed from fine impurities of small particles are mixed with chemicals for bleaching the short fibres.

5. The method of claim 4, wherein the long fibres contained in said fourth aqueous fraction are mixed with chemicals for bleaching the long fibres, and the resulted bleached long fibres then are mixed with bleached short fibre to create a final bright fibre pulp suited for making white paper.

6. The method of claim 5, wherein said screening of fine impurities of small particles from said second aqueous fraction is preceded by washing of said fine impurities of printing ink and filler material from said second aqueous fraction.

7. The method of claim 6 wherein said washing is preceded by flotation separation of the fine impurities of printing ink from said second aqueous fraction.

8. The method of claim 5, wherein said screening of fine impurities of small particles from said second aqueous fraction is preceded by flotation separation of the fine impurities of printing ink from said second aqueous fraction.

* * * * *